(12) United States Patent
Johnson et al.

(10) Patent No.: US 8,091,038 B1
(45) Date of Patent: Jan. 3, 2012

(54) ADAPTIVE GRAPHICAL INTERFACE

(75) Inventors: Elwan Johnson, San Jose, CA (US); German Bauer, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 512 days.

(21) Appl. No.: 11/605,898

(22) Filed: Nov. 29, 2006

(51) Int. Cl.
*G06F 3/00* (2006.01)

(52) U.S. Cl. ........ 715/768; 345/581; 345/589; 345/592; 345/619; 345/629; 345/636; 345/207; 382/274; 715/810; 715/864

(58) Field of Classification Search .......................... None
See application file for complete search history.

(56) References Cited

U.S. PATENT DOCUMENTS

| | | | | |
|---|---|---|---|---|
| 6,636,228 B2 * | 10/2003 | Morton et al. | ................ | 345/589 |
| 6,670,970 B1 * | 12/2003 | Bonura et al. | ................ | 715/768 |
| 7,064,759 B1 * | 6/2006 | Feierbach et al. | ......... | 345/469.1 |
| 7,184,063 B2 * | 2/2007 | Shum et al. | ................... | 345/629 |
| 2005/0022130 A1 * | 1/2005 | Fabritius | ...................... | 715/739 |
| 2007/0097065 A1 * | 5/2007 | Kreek et al. | ................. | 345/102 |
| 2008/0189656 A1 * | 8/2008 | Abanami et al. | .............. | 715/810 |

OTHER PUBLICATIONS

"Yahoo! Stock Ticker," <http://widgets.yahoo.com/gallery/view.php?widget=38246> (visited Feb. 22, 2007).

* cited by examiner

*Primary Examiner* — Antonio Caschera

(74) *Attorney, Agent, or Firm* — Robert C. Kowert; Meyertons, Hood, Kivlin, Kowert & Goetzel, P.C.

(57) ABSTRACT

An adaptive graphical interface may include determining a first visual characteristic of a background portion, selecting a second visual characteristic contrasting with the first visual characteristic, and presenting a graphical feature portion, the graphical feature portion being presented over the background portion, and the graphical feature portion having the second visual characteristic.

26 Claims, 9 Drawing Sheets

ADAPTIVE GRAPHICAL INTERFACE

FIELD OF THE INVENTION

The present invention relates generally to software. More specifically, an adaptive graphical interface is described.

BACKGROUND OF THE INVENTION

An operating system (OS) is a program run on a computer system to provide for system management and to allow other programs to run (i.e., compile and execute). An OS can include a graphical user interface (GUI) to enhance the operation and appearance of the OS. A GUI can include icons, cursors, and windows. GUIs can also include background images (e.g., wallpaper) behind icons, other system elements, and applications run in windows on the OS. Additionally, applications themselves can include palettes, in which information or controls may be located. A palette can be a frame, subwindow, or other visual element that includes information or data.

Applications and palettes can be presented in a way such that the background of the application or palette is translucent. Using a translucent application or palette, a user can see a portion of the background through the application or palette. The translucent elements may provide improved content context by revealing more of the content area. However, if the color of the text or controls within the application or palette is similar to the color of the background, the text or controls may be difficult to read or use.

Thus, what is needed is a graphical interface without the limitations of conventional techniques.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to various examples, an adaptive graphical interface is disclosed. A graphical interface may be any interface that includes graphics such as a graphical user interface (GUI). An adaptive graphical interface may include one or more graphical features, whose appearances adapt, adjust, or change ("adapt") based on visual characteristics of a background behind the graphical features. A graphical feature may be, for example, a window, palette, icon, or any other interface element that may be displayed independently or as part of an interface. A background may be behind a graphical feature (or a graphical feature may be over a background) when the graphical feature is displayed so that the graphical feature covers a portion of the background. The graphical feature may be translucent and the background may be partially or wholly visible through the graphical feature. A visual characteristic may be any quantifiable property of an image or a portion of an image. For example, a visual characteristic of an image may be a level of brightness, color, hue, or tone (e.g., 128 on a scale of 0 to 255). A portion of the background behind a graphical feature may have a visual characteristic (e.g., a level of brightness) that may be determined. Another visual characteristic (another level of brightness) that contrasts the visual characteristic of the background may be selected and applied to the graphical feature. The graphical feature may contrast the background behind the graphical feature. In other examples, characteristics of text of a graphical feature may also be selected to provide contrast.

Adaptive Graphical Features

Figure 1A:
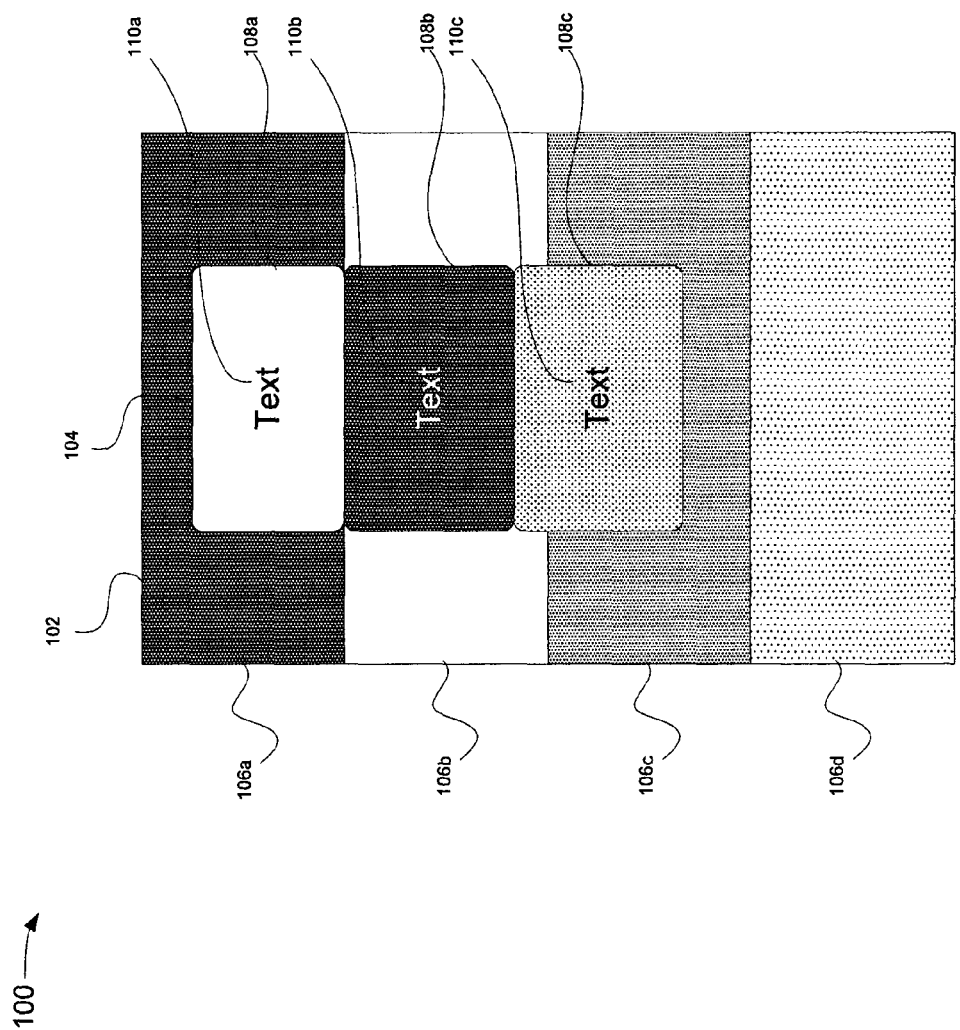
FIGS. 1A-1C illustrate a desktop according to various examples.
Figure 1B:
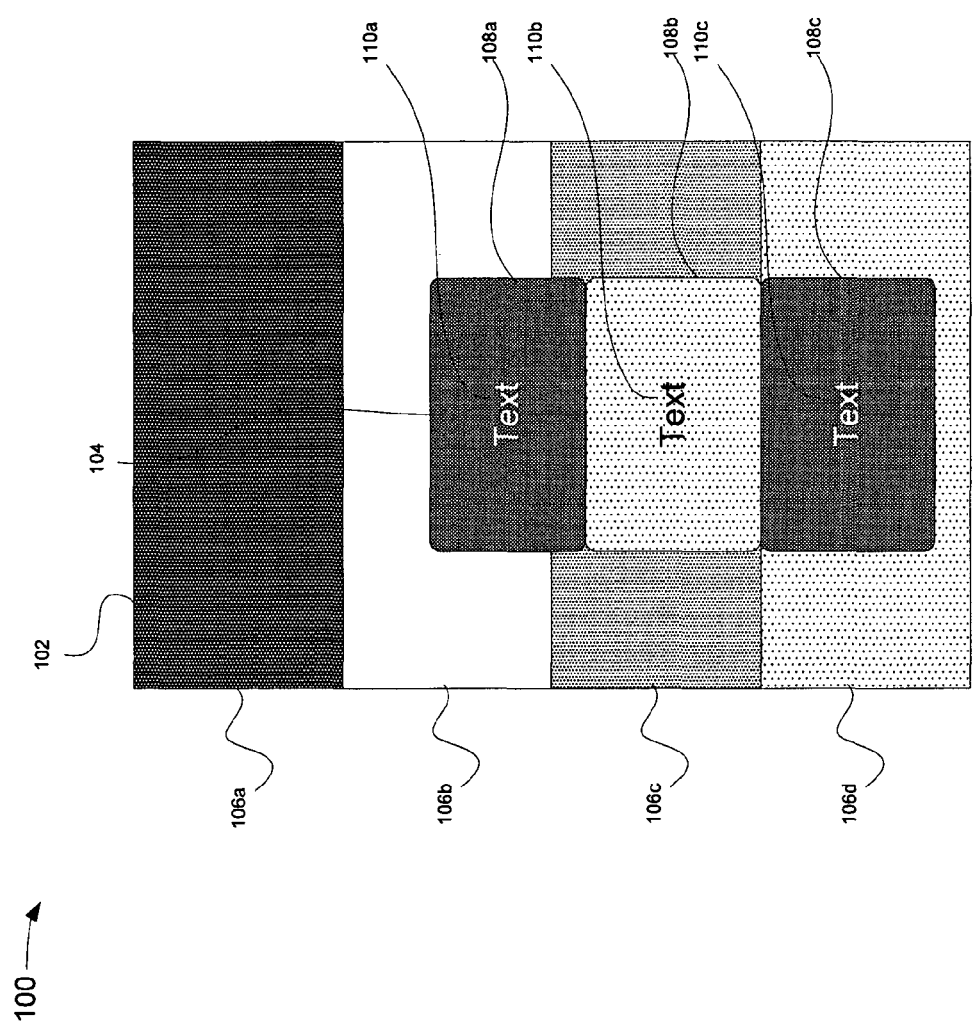
Figure 1C:
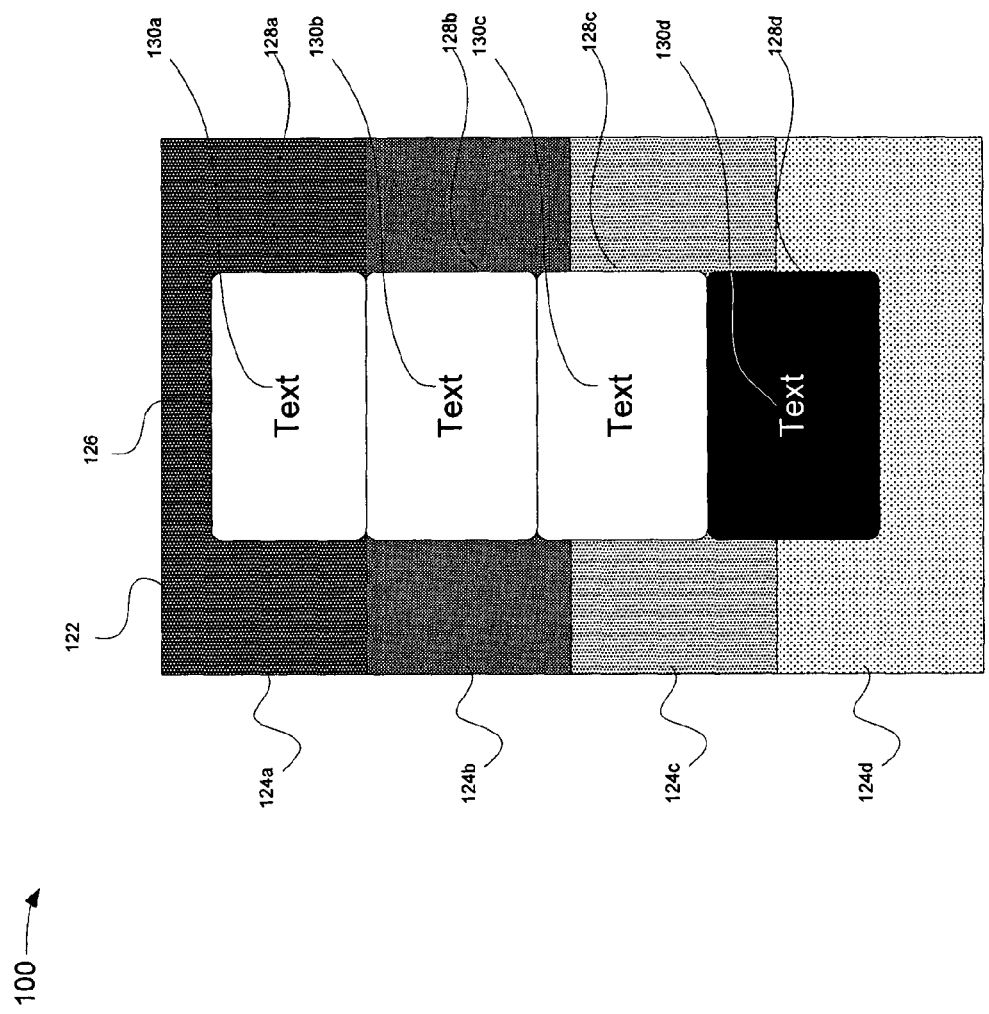

FIGS. 1A-1C illustrate a desktop 100 according to various examples. The desktop 100 may be an area in which items (e.g., graphical features) are displayed. For example, the desktop 100 may be a desktop of a graphical user interface (GUI) of an operating system of a personal computer, portable device such as a cellular telephone or personal digital assistant (PDA) or a set-top box or other device connected to a display. In some examples, the desktop 100 may be the working area of any graphical interface.

FIG. 1A illustrates the desktop 100 including a background 102 and a graphical feature 104. As used herein, a "portion" of the background 102 or of the graphical feature 104 refers to any divisible portion of the background 102 or graphical feature 104; for example, a portion of the background 102 may refer to the portion of the background 102 over which the graphical feature 104 is located. The background 102 may be, for example, an image such as a wallpaper image that may include regions of disparate color and brightness values (e.g., may have disparate visual characteristics). The background 102 includes four areas 106a-106d, each of which may be described by a visual characteristic as a whole, or portions of which may be described by a visual characteristic. For example, a level of brightness may be used to describe each of the four areas 106a-106d. The background 102 may be divided into any number of areas, each having visual characteristics. The background 102 may be an image such as a bitmap image including several pixels arranged in a rectangular shape.

A visual characteristic may be determined for any portion of the background 102, from an individual pixel, to one of the areas 106, to the entire background 102. According to an example, a visual characteristic of a portion of the background 102 may be determined by averaging the properties of the pixels within the portion (see e.g., FIGS. 2A-2B). For example, the area 106a may have a brightness of 10, the area 106b may have a brightness of 250, and the combined areas 106a and 106b may have a brightness of 120. According to an example, a visual characteristic for a portion the graphical feature (e.g., one of the palettes 108) may be selected to contrast a portion of the background 102 behind the portion of the graphical feature 104.

The graphical feature 104 may be, as shown here, a collection of palettes 108 that may display text or other information. The graphical feature 104 may display the output of a program such as a stock tracker, sports score tracker, system monitor, and others. In some examples, an application, tools, or other type of palette may be an interface element in which information (e.g., text, graphs, controls, or images) relating to an application may be displayed. A palette is an example of a graphical feature or a part of a graphical feature. Although the graphical feature 104 includes three palettes 108, it is understood that more or fewer palettes may be used, or that the graphical feature 104 may include any other interface element or graphic. The graphical feature 104 may additionally be any type of interface element, such as a window, icon, or frame.

The palettes 108a-108c may each include some text 110a-110c, respectively. For example, the graphical feature 104 may be used with image or video editing software to display and monitor editing tools. According to an example, a visual characteristic of the graphical feature 104 (e.g., the level of brightness, color, tone, opacity, or hue) may change based on the location of the graphical feature 104 over the background 102, so that the text 110 or other display within the graphical feature 104 is legible. For example, when the graphical feature 104 is moved (or when the background 102 changes), the visual characteristic of the portion of the background 102 behind the graphical feature 104 may change, and the visual characteristic of the graphical feature 104 may change in response to the change in the background so that the graphical feature 104 contrasts the background 102. According to another example, and as shown here, individual portions of the graphical feature (e.g., each palette 108a-108c) may have a different visual characteristic depending on the visual characteristics of the portion of the background 102 behind the portion of the graphical feature 104. Here, brightness is described as an example of a visual characteristic of the graphical feature 104. However, it is understood that any other property (e.g., color, tone, opacity, or hue) may be used to describe a visual characteristic.

Figure 2A:
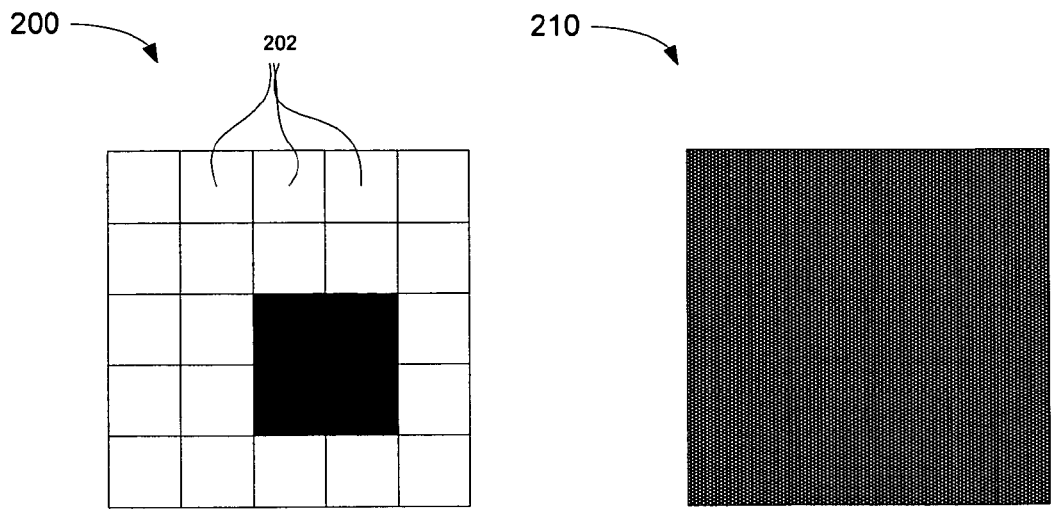
FIGS. 2A and 2B illustrates averaging the brightness (or other visual characteristic) of a portion of a background to determine a brightness (or other visual characteristic) of a graphical feature displayed over the portion.
Figure 2B:
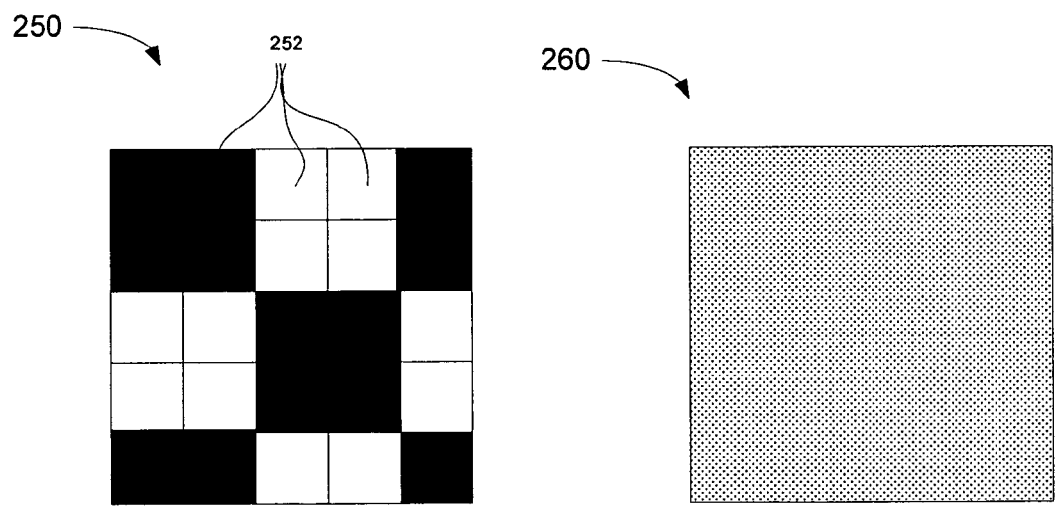

The palette 108a is white with black text 110a. The palette 108a is over the area 106a of the background 102. A portion of the area 106a that is covered by the palette 108a may be used to determine the brightness. For example, although as shown here, the portion of the area 106a underneath the palette 108a is uniform, as shown in FIGS. 2A and 2B, the brightness may not be uniform. The portion 106a is dark (i.e., has a low brightness), and the palette 108a correspondingly is given a high brightness. The palette 108a may be translucent; by giving it high brightness, the text 110a of the palette 108a may be legible. According to an example, the contrasting brightness of the graphical feature 104 may be determined by inverting the brightness of the portion of the background 102 behind the graphical feature 104. For example, on a scale of 0 to 255, if the portion of the background 102 behind the graphical feature 104 has a brightness of 10, the graphical feature (or portion thereof) may be given a brightness of 245. Other techniques for determining a contrasting brightness of the graphical feature 104 may also be used.

In other examples, the palette 108a may also have a base tone. For example, the palette 108a may be blue, and the brightness of the palette 108a may be altered to generate different shades of blue so that the brightness (i.e., a visual characteristic) of the palette 108a is calculated such that the palette 108a contrasts the area 106a of the background 102.

The color of the text 110a may also be chosen to be legible over the palette 108a or the graphical feature 104. For example, the text 110a is black so that it is legible over the white palette 108a. According to an example, the text 110a may either be black or white. The text 110a may change from white to black when the palette 108a changes from dark gray to light gray. According to another example, the text 110a may have any color or brightness, and may also be chosen to contrast the palette 108a.

The palette 106b is gray with black text 110b. The brightness of the palette 108b may be selected (e.g., calculated) to contrast with the area 106b of the background 102. Likewise, the palette 108c is a lighter gray with black text 110b. In this way the text 110b and 110c are legible over the background 102.

The palette 108c is over the area 106b and the area 106c. According to an example, the palette 108c may have a single brightness value. In this case, the brightness or other visual characteristic of the palette 108c may be determined based on the visual characteristic of the area 106b, the area 106c, or a combination of the two. Further, as described regarding FIGS. 2A and 2B, the visual characteristic of the graphical feature 104 may also be determined by averaging the values of a portion that has different values for the visual characteristic, or by "banding" the graphical feature 104, so that it may have more than one visual characteristic (see FIG. 3).

A visual characteristic of the graphical feature 104 or portions thereof (e.g., the palettes 108) may be selected to contrast a portion of the background 102 behind the graphical feature 104 or portion thereof. The visual characteristic of the graphical feature 104 may be calculated to provide contrast, for example by inverting the brightness of the portion of the background 102. According to another example, a lookup table may be used. For example, a lookup table may include various values of visual characteristics (e.g., brightness values) for the background 102, and may include corresponding contrasting values of visual characteristics for the graphical feature 104. When the visual characteristic is a color, for example, it may be determined that a first color contrasts a second color, which may be noted in the lookup table. When a background includes the first color, a graphical feature over the background may have the second color.

The graphical feature 104 may be moved relative to the background, for example by a user or a process. FIG. 1B illustrates the graphical feature 104 over the background 102 after the graphical feature 104 has been moved according to an example. When the graphical feature 104 is moved, the visual characteristics of the palettes 108a-108c (or the graphical feature 104 as a whole) may be changed so that the palettes 108 continue to contrast with the background 102. According to another example, the brightness of the palettes 108 (e.g., palettes 108a, 108b, 108c) and, in some examples, the graphical feature 104 may change in response to changes in the background 102. For example, the palette 108c is located over the area 106d of the background 102. The area 106d is light, and the palette 108*c* is given a correspondingly dark (e.g., low value) brightness. The text 110*c* may be presented (e.g., displayed, rendered, or the like) in white to contrast with the brightness of the palette 108*c*. The palette 108*b* is over the dark area 106*c*, and is presented using a light brightness.

The palette 108*a* is presented over both the area 106*b* and 106*c*, which average to a light brightness. Correspondingly, the palette 108*a* is dark (e.g., has a low brightness). According to another example (see, e.g., FIG. 3), portions of the palette 108*a* may have different brightness, for example, the bottom portion of the palette 108*a* may be light to contrast with the dark area 106*c*, and the top of the palette 108*a* may be dark to contrast with the light area 106*b*. Similarly, the text 110*a* may have more than one brightness level if the palette 108*a* has different areas of brightness.

FIG. 1C illustrates a graphical feature 126 that adapts to predetermined visual characteristics according to an example. As shown here, the graphical feature 126 includes four palettes 128*a*, 128*b*, 128*c*, and 128*d*, each having text 130*a*, 130*b*, 130*c*, and 130*d*, respectively. A background 122 behind the graphical feature 126 has four areas 124*a*, 124*b*, 124*c*, and 124*d* of different brightness (e.g., having different visual characteristics).

As shown here, the palettes 128 may be either black or white depending on the brightness of the portion of the background 122 behind the palettes 128. The palettes 128*a*, 128*b*, and 128*c* are white because the areas 124*a*, 124*b*, and 124*c* are dark. The palette 128*d* is black because the portion of the background 122 behind the palette 128*d* (e.g., part of the area 124*c* and part of the area 124*d*) may average to a value that, when implemented, presents a light brightness.

According to other examples, any levels of brightness or numbers of levels of brightness may be chosen. A system may use black and white palettes 128 when, for example, the system has few available video resources. The system may also use black and white palettes (or a reduced number of color selections) when a designer of the system chooses to do so.

Averaging Visual Characteristics of a Portion

FIGS. 2A and 2B illustrates averaging the brightness (or other visual characteristic) of a portion of a background to determine a brightness (or other visual characteristic) of a graphical feature displayed over the portion. Brightness is described here to maintain the clarity of the description, it is understood that any visual characteristic such as color, tone, opacity, or hue may also be used.

A portion 200 may be any portion of a background. The portion 200 includes 25 pixels 202. A portion 250 may be another portion of a background. The portion 250 includes 25 pixels 252. As shown here, each of the 25 pixels is either black or white. It is understood, however, that the pixels may have any brightness, color, or other visual characteristic.

The overall brightness of the portion 200 may be determined using one of several techniques. For example, the brightness may be determined by averaging the brightness values of the pixels in the portion 200. Using this technique, if the white pixels have a brightness value of 1, and the black pixels 0, the brightness of the portion 200 may be:

$$\frac{((21 \text{ whitepixels} * 1 \text{ brightness}) + (4 \text{ blackpixels} * 0 \text{ brightness}))}{25 \text{ pixels}} = 0.84$$

With a portion 250, as shown in FIG. 2B, the brightness may be given as:

$$\frac{((13 \text{ whitepixels} * 1 \text{ brightness}) + (12 \text{ blackpixels} * 0 \text{ brightness}))}{25 \text{ pixels}} = 0.52$$

These equations are examples of determining averages of a brightness of a portion of a background or other graphic. Any numbers may be used in the average, for example, if the portion had 36 pixels, 21 white and 15 black, the average brightness would be 0.58. Additionally, a pixel may have any brightness value, and any other visual property (e.g., color, tone) may be used in place of brightness.

The portion 200 averages out to be off white, while the portion 250 averages out to be gray. A graphical feature 210 displayed over the portion 200 may be dark (e.g., have low brightness) to contrast to the bright portion 200 underneath. Similarly, a graphical feature 260 displayed over the portion 250 may be gray to provide contrast to the portion 250.

As discussed above, other visual characteristics may be used. For example, the color values of the portion 200 may be averaged to determine an average color of the portion 200. For example, the average value of the level of the red, green, or blue channels of a red-green-blue (RGB) display may be used to determine an average color. The graphical feature 210 may have a color selected (e.g., from a lookup table) and applied to the graphical feature 210.

Additionally, the portions 200 and 250 may have any size. The portions 200 and 250 may be as small as a single pixel, for example. The sample size of the portions 200 and 250 may be based on the available video resources of the computer system. For example, on a system with limited video resources, the portions 200 and 250 may be large, for example 36 or 49 pixels. On a system with relatively unlimited resources, the portions 200 and 250 may scale down to a single pixel. According to an example, when the graphical features 210 and 260 (and the graphical feature 104) are displayed, the computer system may be queried to determine its available video resources. For example, a program using the adaptive graphical features may do a loop to determine response time for sampling the background, or may query the system to determine the percentage of system resources the program is using. The sample size may be changed in response to changing system conditions, for example, a reduction or increase in available resources.

Correspondingly, the graphical features 210 and 260 over the portions 200 and 250 may have different sizes to match the various sizes of the portions 200 and 250. For example, a palette (e.g., the palette 108*a*) may include various portions corresponding to the various portions of the background underneath the palette. The portions of the palette may each have a visual characteristic. For example, a palette may have regions of different contrast.

According to another example, the portions may be linked so that the contrast does not change dramatically within the palette. A dramatic change may be one, for example, that changes the contrast more than ten or twenty percent. For example, if the visual characteristic is a level of brightness, the brightness of one portion may be no more or less than twenty percent different than an adjacent portion. Likewise, a visual characteristic may be reselected for a portion of a graphical feature when a portion of a background behind the graphical feature changes. For example, a background may include animation or video. The visual characteristic of the portion of the graphical feature may be reselected at an interval, for example one or two seconds, to reduce large changes in the appearance of the graphical feature. The interval may be determined based on available video resources, a user input, or a predetermined interval, for example.

Other techniques may also be used to determine a visual characteristic of the portions 200 and 250. For example, weighted averages may be used. According to another example, a subportion of the portions 200 or 250 may be used to determine the visual characteristic. For example, the four center pixels 202 may be used to determine the visual characteristic of the portion 200.

Banding of Graphical Features

Figure 3:
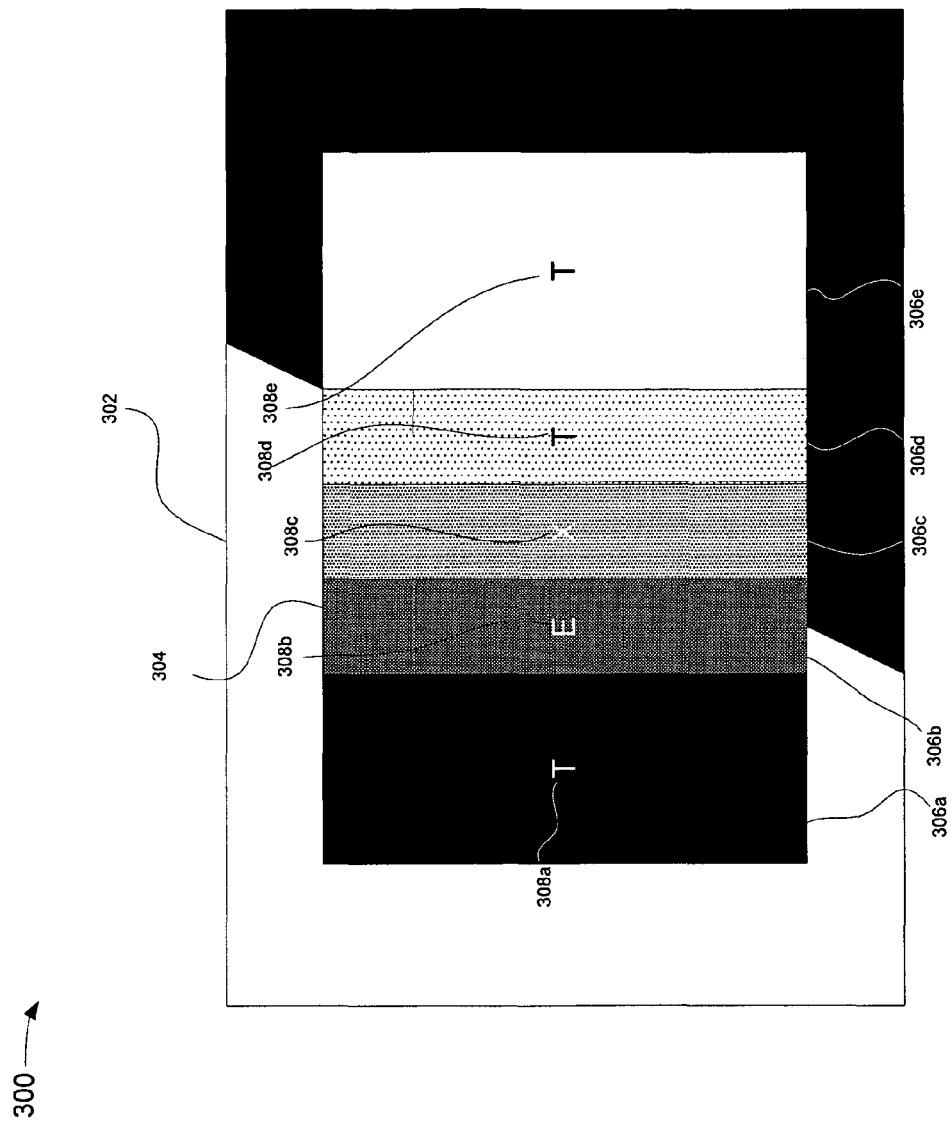
FIG. 3 illustrates displaying a graphical feature with a banded appearance according to an example.

FIG. 3 illustrates a display 300 displaying a graphical feature with a banded appearance according to an example. A background image 302 may have varying levels of brightness underneath a graphical feature 304. For example, the left side of the background 302 is white, while the right side of the background 302 is black, with a diagonal line dividing the white and back portions. The graphical feature 304 may have different bands 306 (e.g. portions of the graphical feature 304) of contrast to improve legibility of characters 308 displayed in the graphical feature 304. The bands 306 may have any shape and be of any size. For example, the bands 306 may be square, and may be as small as a single pixel.

The graphical feature 304 may be divided into several bands 306. The bands 306 may be portions of the graphical feature 304 that have a different brightness. For example, the graphical feature 304 may be divided into the bands 306 because the background 302 has areas of different brightness. The bands 306 may have a size that is determined based on available video resources and the uniformity of the brightness of the background 302 behind the graphical feature 304.

The band 306a is over the white portion of the background 302. As a result, the band 306a is black, to provide contrast, and has white text 308a to provide legibility. The band 306b is mostly over the white portion of the background 302, and partly (near the bottom) over the black portion. The band 306b therefore is dark gray with white text 308b. The band 306c is roughly half over the white portion of the background 302, and half over the black portion of the background 302. The band 308c is therefore a medium gray with white text 308c. However, the text 308c may also be presented in black. The band 306d is mostly over the black portion of the background 302 and partly (near the top) over the white portion of the background. The band 306d is correspondingly light gray with black text 308d. The band 306e is entirely over the black portion of the background 302, and therefore is white with black text 308e.

Various other implementations of banding are possible. For example, bands may be of any size. For example, the size of the bands may depend on the available video resources. Additionally, they may have any orientation or shape, including vertical, horizontal, diagonal, or radial.

Using a Light Sensor to Adapt to Ambient Conditions

Figure 4A:
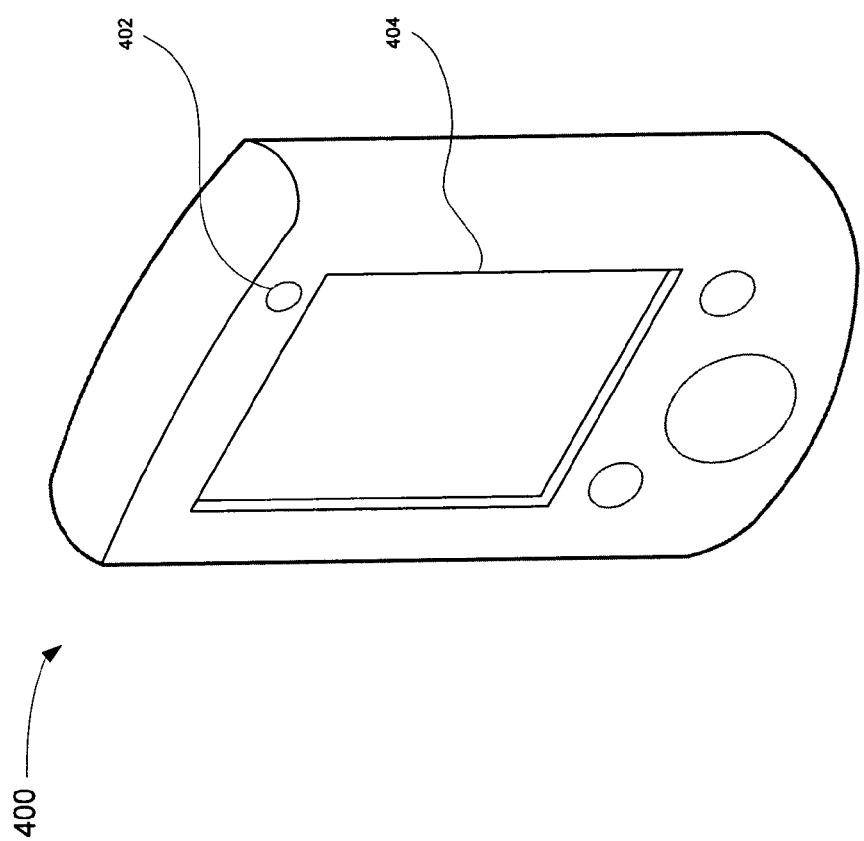
FIG. 4A illustrates a device including a light sensor to adapt to ambient light conditions according to an example.
Figure 4B:
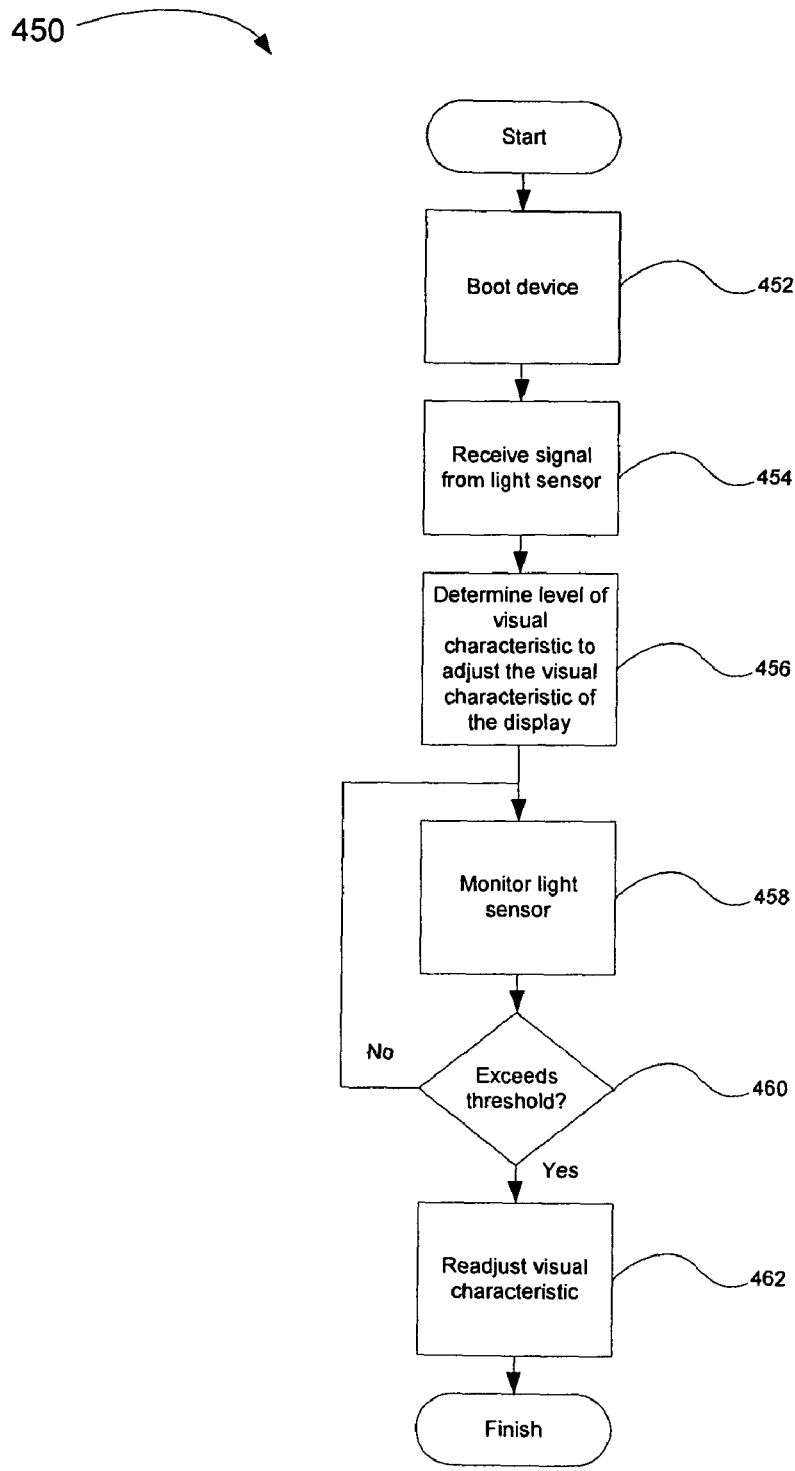
FIG. 4B is a flowchart describing a process for adjusting brightness to improve contrast according to an example.

FIG. 4A illustrates a device 400 including a light sensor to adapt to ambient light conditions according to an example. FIG. 4B is a flowchart describing a process 450 for adjusting brightness to improve contrast according to an example. Portable, mobile, and other devices such a cellular telephone and personal digital assistant (PDA) may include a light sensor that outputs a voltage depending on the amount of ambient light. When a user of a device moves from one area (e.g., indoors) to another area (e.g., outdoors) where the ambient light is different, the screen of the device may become difficult to read or see. Any type of circuit, processor, or other configuration may be used to implement the device 400, and the techniques described herein are not limited to any particular use of a PDA, cellular telephone, or light sensor. Further, although certain techniques are described herein, it is understood that various other techniques may be substituted.

According to an example, the device 400 includes an integrated light sensor 402 and a display 404. The light sensor 402 may, for example, a photoresistor that outputs varying resistance depending on the amount of light received. The display 404 may be, for example, a liquid crystal display (LCD) that may have varying levels of brightness or other visual characteristics (e.g., tone, hue, or color). The display 404 may also have a backlight, which may be used to vary the brightness.

In operation 452, the device 400 is booted. In operation 454, a signal from the light sensor 402 is received. In operation 456, a level of a visual characteristic (e.g., brightness) to adjust a visual characteristic of the display to a desirable level is determined. The level of the characteristic is then applied to the display 404. Any visual characteristic may be used. The visual characteristic may be contrast or brightness of the display, for example. According to another example, the visual characteristic may be opacity. Further, the portions of the display may be adjusted independently of others. In this example, a portion of the display, such as a palette, may have varied opacity based on the signal from the light sensor 402. The opacity of the palette may then be adjusted as the ambient light changes.

In operation 458, the light sensor 402 is monitored. If, in operation 460, there is a change in the output of the light sensor, for example if the change in the output exceeds a predetermined threshold, in operation 462, the visual characteristic (e.g., brightness, contrast) of the display is readjusted to change the contrast of the display.

Process for Adapting Graphical Features

Figure 5:
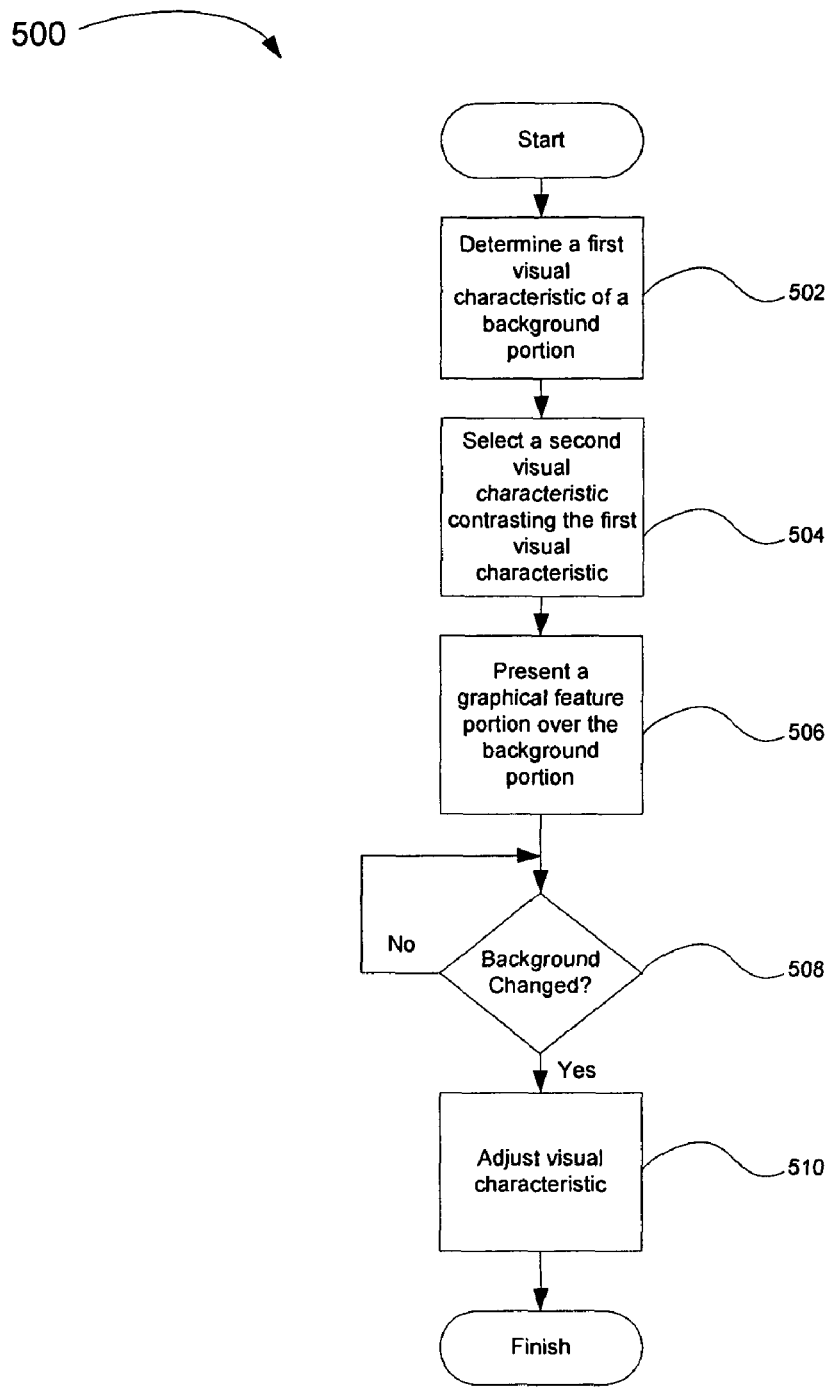
FIG. 5 is a flowchart describing a process for adapting a graphical feature to a background according to an example.

FIG. 5 is a flowchart describing a process 500 for adapting a graphical feature to a background according to an example. A graphical feature may be, for example, an application, palette, window, or other feature (e.g., the graphical feature 104). The background may be a background image or other graphical background such as a wallpaper (e.g., the background 102).

In operation 502, a first visual characteristic of a background portion of a background is determined. The background portion may be an area of the background (e.g., the portions 200 and 250), the size of which may be determined based on the available video resources of the computer system. The first visual characteristic of the background may be, for example, a brightness of the background, a color of the background, a hue of the background, or a tone of the background. If the portion is larger than one pixel, the first visual characteristic may be determined by averaging the visual characteristics of the individual pixels of the background portion (see, e.g., FIGS. 2A and 2B).

In operation 504, a second visual characteristic contrasting the first visual characteristic is selected. The second visual characteristic (e.g., brightness) may be selected using various techniques, for example those described regarding FIGS. 1A-1C and FIG. 3 to determine a contrasting visual characteristic. For example, if the visual characteristic is brightness, and the first visual characteristic is a low brightness, then the second visual characteristic may be a high brightness (i.e., the second visual characteristic may be a brightness that is the inverse of the first visual characteristic).

In operation 506, a graphical feature portion of the graphical feature is presented over the background portion. The graphical feature portion (i.e., some part of the graphical feature) may have the second visual characteristic so that the graphical feature portion contrasts the background portion.

In operation 508, it is determined whether the background portion has changed. The background portion may change when, for example, there is motion in the background or when the graphical feature moves relative to the background. If the background portion has changed, the second visual characteristic may be adjusted in operation 510 so that the graphical feature portion continues to contrast the background portion. If the graphical feature is moved to another background portion, the process 500 may be repeated for that new background portion.

In some examples, the adjustment of the second visual characteristic in operation 510 may be implemented using an interval of adjustment. For example, if the second visual characteristic is adjusted too often, the graphical feature may become distracting to a user. Alternatively, a system may have too few available video resources to frequently adjust the second visual characteristic. An interval (e.g., one or two seconds) may be determined to limit the frequency of adjustment of the second visual characteristic. The interval may be determined based on any criteria; for example, and an interval may be based on a user input (e.g., a user wants to slow the rate of adjustment), available video resources, or a predetermined interval.

An Exemplary Computer System

Figure 6:
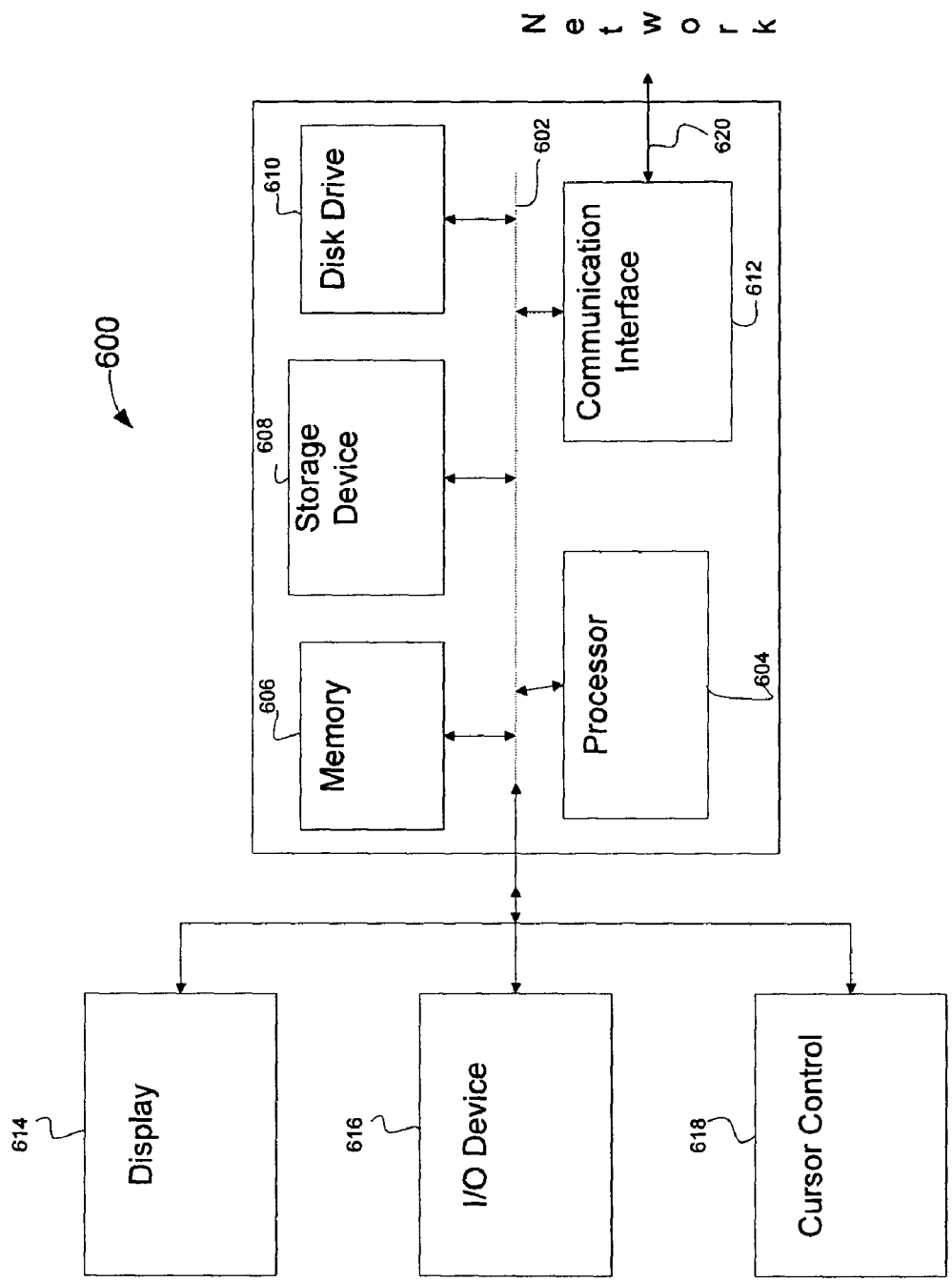
FIG. 6 is a block diagram illustrating an exemplary computer system suitable for implementing an adaptive graphical interface, in accordance with various examples.

FIG. 6 is a block diagram illustrating an exemplary computer system suitable for implementing an adaptive graphical interface, in accordance with various examples. In some examples, a computer system 600 may be used to implement computer programs, applications, methods, processes, or other software to perform the above-described techniques. The computer system 600 includes a bus 602 or other communication mechanism for communicating information, which interconnects subsystems and devices, such as a processor 604, a system memory 606 (e.g., RAM), a storage device 608 (e.g., ROM), a disk drive 610 (e.g., magnetic or optical), a communication interface 612 (e.g., modem or Ethernet card) having a network connection 620, a display 614 (e.g., CRT or LCD), an input device 616 (e.g., keyboard), and a cursor control 618 (e.g., mouse or trackball).

According to some examples, the computer system 600 performs specific operations by processor 604 executing one or more sequences of one or more instructions stored in the system memory 606. Such instructions may be read into the system memory 606 from another computer readable medium, such as the static storage device 608 or the disk drive 610. In some examples, hard-wired circuitry may be used in place of or in combination with software instructions to implement various examples.

Although the foregoing examples have been described in some detail for purposes of clarity of understanding, the examples are not limited to the details provided. There are many alternative ways of implementing the examples. The disclosed examples are illustrative and not restrictive.

What is claimed is:

1. A method, comprising:
  displaying, by a computer device, a translucent graphical user interface area over a portion of a background, wherein the portion of the background is at least partially visible through the translucent graphical user interface area, wherein the portion of the background is less than all of the background, and wherein the translucent graphical user interface area is a window;
  wherein said displaying comprises:
    determining, by a computer device, a first visual characteristic of the portion of the background; and
    adjusting, by a computer device, a second visual characteristic of the translucent graphical user interface area,
    wherein said adjusting is dependent on the first visual characteristic and improves visibility of one or more elements of the translucent graphical user interface area relative to the portion of the background that is at least partially visible through the translucent graphical user interface area,
    wherein the second visual characteristic varies across the translucent graphical user interface area dependent on a variance of the first visual characteristic of the portion of the background that is at least partially visible through the translucent graphical user interface area, and
    wherein a first value of the second visual characteristic at a first location in a graphical feature of the translucent graphical interface area is different from a simultaneous second value of the second visual characteristic at a second location in the graphical feature of the translucent graphical user interface area in response to a difference between a first value of the first visual characteristic at a first location in the portion of the background and a simultaneous second value of the first visual characteristic at a second location in the portion of the background; and
  subsequent to a change to the portion of the background over which the translucent graphical user interface area is displayed, repeating said determining and said adjusting.

2. The method of claim 1, wherein determining the first visual characteristic comprises determining a brightness of the portion of the background.

3. The method of claim 2, wherein determining the brightness of the portion of the background comprises averaging a set of brightness values for the portion of the background.

4. The method of claim 1, wherein adjusting the second visual characteristic comprises selecting a brightness contrasting with another brightness associated with the portion of the background.

5. The method of claim 1, wherein determining the first visual characteristic comprises determining a color of the portion of the background.

6. The method of claim 1, wherein adjusting the second visual characteristic comprises selecting a color of the translucent graphical user interface area based on a table.

7. The method of claim 1, wherein said adjusting is performed according to an interval, wherein the interval limits the frequency at which the second visual characteristic can be adjusted.

8. The method of claim 7, further comprising determining the interval based on an available video resource.

9. The method of claim 7, further comprising determining the interval based on a user input.

10. The method of claim 1, further comprising:
  receiving a signal from a light sensor;
  determining if the signal exceeds a threshold; and
  adjusting at least the second visual characteristic of the translucent graphical user interface area to compensate for the signal in response to the signal exceeding the threshold.

11. The method of claim 10, wherein adjusting at least the second visual characteristic further comprises increasing a contrast of a display upon which the translucent graphical user interface area is displayed in response to the signal indicating an increase in ambient light.

12. The method of claim 10, wherein adjusting at least the second visual characteristic further comprises decreasing a contrast of a display upon which the translucent graphical user interface area is displayed in response to the signal indicating a decrease in ambient light.

13. The method of claim 10, wherein adjusting at least the second visual characteristic of the translucent graphical user interface area comprises adjusting the brightness of a display upon which the translucent graphical user interface area is displayed.

14. The method of claim 10, further comprising:
monitoring the signal from the light sensor; and
readjusting at least the second visual characteristic in response to the signal exceeding the threshold.

15. The method of claim 10, wherein adjusting at least the second visual characteristic of the translucent graphical user interface area comprises adjusting an opacity of a portion of a display upon which the translucent graphical user interface area is displayed.

16. A method, comprising:
displaying, by a computer device, a translucent graphical user interface area over a portion of a background, wherein the portion of the background is at least partially visible through the translucent graphical user interface area, wherein the portion of the background is less than all of the background, and wherein the translucent graphical user interface area is a window;
wherein said displaying comprises:
determining, by a computer device, a first visual characteristic of the portion of the background; and
adjusting, by a computer device, a second visual characteristic of the translucent graphical user interface area,
wherein said adjusting is dependent on the first visual characteristic and improves visibility of one or more elements of the translucent graphical user interface area relative to the portion of the background that is at least partially visible through the graphical user interface area,
wherein the second visual characteristic varies across the translucent graphical user interface area dependent on a variance of the first visual characteristic of the portion of the background that is at least partially visible through the translucent graphical user interface area, and
wherein a first value of the second visual characteristic at a first location in a graphical feature of the translucent graphical interface area is different from a simultaneous second value of the second visual characteristic at a second location in the graphical feature of the translucent graphical user interface in response to a difference between a first value of the first visual characteristic at a first location in the portion of the background and a simultaneous second value of the first visual characteristic at a second location in the portion of the background;
monitoring the portion of the background to detect a change to the portion of the background; and
in response to detecting a change to the portion of the background over which the translucent graphical user interface area is displayed, repeating said determining and said adjusting.

17. The method of claim 16, wherein said adjusting is performed according to an interval, wherein the interval limits the frequency at which the second visual characteristic can be adjusted.

18. The method of claim 16, wherein determining the first visual characteristic comprises averaging visual characteristics of subportions of the portion of the background.

19. The method of claim 16, wherein said change to the portion of the background is a result of the translucent graphical user interface area moving relative to the portion of the background.

20. A system, comprising:
a memory configured to store data associated with a graphical interface; and
a processor configured to:
display a translucent graphical user interface area over a portion of a background, wherein the portion of the background is at least partially visible through the translucent graphical user interface area, wherein the portion of the background is less than all of the background, and wherein the translucent graphical user interface area is a window;
wherein said display comprises:
determine a first visual characteristic of the portion of the background; and
adjust a second visual characteristic of the translucent graphical user interface area,
wherein said adjusting is dependent on the first visual characteristic and improves visibility of one or more elements of the translucent graphical user interface area relative to the portion of the background that is at least partially visible through the translucent graphical user interface area,
wherein the second visual characteristic varies across the translucent graphical user interface area dependent on a variance of the first visual characteristic of the portion of the background that is at least partially visible through the translucent graphical user interface area, and
wherein a first value of the second visual characteristic at a first location in a graphical feature of the translucent graphical interface area is different from a simultaneous second value of the second visual characteristic at a second location in the graphical feature of the translucent graphical user interface area in response to a difference between a first value of the first visual characteristic at a first location in the portion of the background and a simultaneous second value of the first visual characteristic at a second location in the portion of the background; and
subsequent to a change to the portion of the background over which the translucent graphical user interface area is displayed, repeating said determining and said adjusting.

21. The system of claim 20, the processor being further configured to:
determine a first brightness of the portion of the background; and
adjust the second visual characteristic based on a second brightness contrasting with the first brightness.

22. The system of claim 21, the processor being further configured to adjust the second visual characteristic according to an interval, wherein the interval limits the frequency at which the second visual characteristic can be adjusted.

23. A computer readable storage medium storing computer instructions that when executed on a computer cause the computer to perform:
displaying a translucent graphical user interface area over a portion of a background,
wherein the portion of the background is at least partially visible through the translucent graphical user interface area, wherein the portion of the background is less than all of the background, and wherein the translucent graphical user interface area is a window;

wherein said displaying comprises:

determining a first visual characteristic of the portion of the background; and adjusting a second visual characteristic of the translucent graphical user interface area, wherein said adjusting is dependent on the first visual characteristic and improves visibility of one or more elements of the translucent graphical user interface area relative to the portion of the background that is at least partially visible through the translucent graphical user interface area, wherein the second visual characteristic varies across the translucent graphical user interface area dependent on a variance of the first visual characteristic of the portion of the background that is at least partially visible through the translucent graphical user interface area, and wherein a first value of the second visual characteristic at a first location in a graphical feature of the translucent graphical interface area is different from a simultaneous second value of the second visual characteristic at a second location in the graphical feature of the translucent graphical user interface area in response to a difference between a first value of the first visual characteristic at a first location in the portion of the background and a simultaneous second value of the first visual characteristic at a second location in the portion of the background; and subsequent to a change to the portion of the background over which the translucent graphical user interface area is displayed, repeating said determining and said adjusting.

24. The computer readable storage medium of claim 23, wherein determining the first visual characteristic comprises determining a first brightness of the portion of the background.

25. The computer readable storage medium of claim 24, wherein adjusting the second visual characteristic comprises selecting a second brightness contrasting with the first brightness.

26. The computer readable storage medium of claim 23, wherein the computer instructions when executed on the computer further cause the computer to perform adjusting the second characteristic according to an interval, wherein the interval limits the frequency at which the second visual characteristic can be adjusted.

\* \* \* \* \*